United States Patent
Pugh et al.

(10) Patent No.: US 9,164,297 B2
(45) Date of Patent: Oct. 20, 2015

(54) OPHTHALMIC DEVICES WITH STABILIZATION FEATURES

(71) Applicant: Johnson & Johnson Vision Care, Inc., Jacksonville, FL (US)

(72) Inventors: Randall B. Pugh, Jacksonville, FL (US); Karson S. Putt, Jacksonville, FL (US); Edward R. Kernick, Jacksonville, FL (US); Frederick A. Flitsch, New Windsor, NY (US); Camille Higham, Jacksonville, FL (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 43 days.

(21) Appl. No.: 13/836,897

(22) Filed: Mar. 15, 2013

(65) Prior Publication Data

US 2014/0268024 A1    Sep. 18, 2014

(51) Int. Cl.
*G02C 7/04* (2006.01)
*G02C 7/08* (2006.01)

(52) U.S. Cl.
CPC ............... *G02C 7/048* (2013.01); *G02C 7/083* (2013.01)

(58) Field of Classification Search
CPC .......... G02C 7/04; G02C 7/041; G02C 7/042; G02C 7/043; G02C 7/044; G02C 7/045; G02C 7/048; G02C 7/049
USPC .............. 351/159.22, 159.24, 159.36, 159.19
See application file for complete search history.

(56) References Cited

U.S. PATENT DOCUMENTS

| | | | |
|---|---|---|---|
| 3,431,327 A | | 3/1969 | Tsuetaki |
| 4,859,049 A | | 8/1989 | Muller |
| 4,874,234 A | * | 10/1989 | Wichterle ............... 351/159.21 |
| 6,113,236 A | * | 9/2000 | Chapman et al. ......... 351/159.21 |
| 6,139,146 A | * | 10/2000 | Zhang ....................... 351/159.22 |
| 6,217,171 B1 | | 4/2001 | Auten et al. |
| 7,322,694 B2 | * | 1/2008 | Dahi et al. ............... 351/159.14 |
| 2004/0027536 A1 | | 2/2004 | Blum et al. |
| 2004/0141150 A1 | * | 7/2004 | Roffman et al. ............. 351/164 |
| 2006/0055884 A1 | | 3/2006 | Molinari et al. |
| 2009/0141235 A1 | | 6/2009 | Collins et al. |
| 2009/0213459 A1 | | 8/2009 | Amirparviz |
| 2010/0072643 A1 | | 3/2010 | Pugh et al. |
| 2012/0120365 A1 | | 5/2012 | Legerton et al. |
| 2012/0140167 A1 | | 6/2012 | Blum |
| 2012/0236524 A1 | | 9/2012 | Pugh et al. |
| 2014/0268033 A1 | | 9/2014 | Pugh |

FOREIGN PATENT DOCUMENTS

| | | |
|---|---|---|
| EP | 2512777 B1 | 10/2012 |
| EP | 2778756 A1 | 9/2014 |
| WO | WO 2004099858 A1 | 11/2004 |

OTHER PUBLICATIONS

European Search Report for Application No. EP 14 16 0059 Date of Completion of Report Jun. 5 2014.
Singapore Search Report Application No. 10201400532T Date of submission of the request Aug. 4, 2014 Date of the actual completion of the Dec. 31, 2014; Date the report was received from the Singapore agent Mar. 10 2015.

* cited by examiner

*Primary Examiner* — Darryl J Collins (57) ABSTRACT

This invention discloses methods and apparatus for forming Ophthalmic Lenses with Stabilizing Features, and more specifically, Ophthalmic Lenses that include an encapsulated Insert Device.

13 Claims, 5 Drawing Sheets

OPHTHALMIC DEVICES WITH STABILIZATION FEATURES

FIELD OF USE

This invention describes methods, apparatus and devices related to the inclusion of stabilization features into Ophthalmic Devices and more specifically, in some embodiments, where orientation on the eye is significant to the functionality of the Ophthalmic Device.

BACKGROUND

Traditionally, an Ophthalmic Device, such as a contact lens or an intraocular lens, included a biocompatible device with a corrective, cosmetic, or therapeutic quality. A contact lens, for example, can provide one or more of vision correcting functionality, cosmetic enhancement, and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics may be accomplished without the lens entering into an energized state. The functionality of the Lens may depend on a specific orientation of the Lens on the eye. Accordingly, a need to stabilize the orientation on the eye may be significant.

More recently, active components have been incorporated into a contact lens, and the incorporation may involve encapsulating energizing elements within the Ophthalmic Device. The relatively complicated components to accomplish this effect may derive improved characteristics by including them in insert devices which are then included with standard or similar materials useful in the fabrication of state of the art Ophthalmic Lenses. It may be desirable to improve the process, methods and resulting devices for realizing inserts of various kinds. And, it may be anticipated that some of the solutions for energized inserts may provide novel aspects for non-energized devices and other biomedical devices. Accordingly novel methods, devices and apparatus relating to the thermoforming of various components in ophthalmic and biomedical devices formed with inserts are therefore important.

SUMMARY

The present invention includes innovations relating to an Ophthalmic Device with Stabilizing Features, the Ophthalmic Device comprising a lens comprising a biocompatible material, wherein the biocompatible material allows for placement of the lens on an eye; a first Rigid Insert, wherein the Ophthalmic Device encapsulates the first Rigid Insert; and a Stabilizing Feature, wherein the Stabilizing Feature orients the lens when the Ophthalmic Device is placed on the eye. The biocompatible material may comprise a polymerized Hydrogel, for example a hydrogel.

In some embodiments, the Stabilizing Feature may comprise a second material included within the lens. The Stabilizing Feature may alter a front curve surface of the Ophthalmic Device. The lens may form from polymerizing the biocompatible material between a front curve mold and a back curve mold. The Stabilizing Feature may form from an aberration on a surface of the front curve mold in contact with the biocompatible material.

Alternatively, the first Rigid Insert may include the Stabilizing Feature. The Rigid Insert may include a surface with a colored pattern. The Rigid Insert may comprise a thermoformed three-dimensional shape. The Stabilizing Feature may form from an injection of the second material.

The Stabilizing Feature may comprise a second Rigid Insert and a third Rigid Insert. In such embodiments, the second Rigid Insert and the third Rigid Insert alter the front surface topography of the Ophthalmic Device. The second Rigid Insert and the third Rigid Insert may comprise coloration or a marking, where the coloration or the marking is a visible orientation cue, allowing the user to see how to place the Ophthalmic Lens on the eye for proper orientation.

DETAILED DESCRIPTION OF THE INVENTION

The present invention includes methods and apparatus for manufacturing an Ophthalmic Lens with a Rigid Insert wherein the Ophthalmic Lens includes Stabilizing Features. In addition, the present invention includes an Ophthalmic Lens with a Rigid Insert, wherein the Ophthalmic Lens includes Stabilizing Features. According to the present invention, an Ophthalmic Lens is formed with a Rigid Insert, and Stabilizing Features may be incorporated into the Ophthalmic Lens. In some embodiments, the functionality of the Ophthalmic Lens may depend on a specific orientation on the eye.

In some cases, the Rigid Insert may comprise multiple pieces that create a cavity. The cavity may include an Energy Source, such as an electrochemical cell or battery as the storage means for the energy. In some embodiments, a Rigid Insert also includes a pattern of circuitry, components, and Energy Sources. Various embodiments may include the Rigid Insert locating the pattern of circuitry, components, and Energy Sources around a periphery of an Optic Zone through which a wearer of a lens would see, while other embodiments may include a pattern of circuitry, components, and Energy Sources that are small enough to not adversely affect the sight of a contact lens wearer allowing placement of the electrical elements within the Optic Zone.

The insert pieces of the Rigid Insert may be formed by thermoforming, and there may be numerous steps that occur on a thin substrate sheet before thermoforming or on an insert piece after thermoforming that may address the functionalities of insert-based Ophthalmic Devices.

In general, according to some embodiments of the present invention, a Rigid Insert may be embodied within an Ophthalmic Lens via automation that places the insert a desired location relative to a mold part used to fashion the lens. Some embodiments that place the insert pieces into the Ophthalmic Lens may include steps to seal or encapsulate the insert piece.

Some embodiments may include a cast molded silicone hydrogel contact lens with a rigid or formable energized insert contained within the Ophthalmic Lens in a biocompatible fashion where patterning may occur on surfaces of the insert or at or near the surface of the Ophthalmic Device itself. Still further embodiments may derive from thermoforming of insert pieces, wherein the insert formed from the pieces contains components that may not be energized or may reside in an Ophthalmic Device which is not energized.

Any of the various methods of forming the ophthalmic inserts by use of thermoforming may be further used in some embodiments to create Ophthalmic Lens devices. By positioning an insert within a cavity defined by front and back curve mold pieces and surrounding the insert with Reactive Mixture, which may then be polymerized, an Ophthalmic Lens may be formed. In some embodiments the insert may be positioned in a small amount of a reactive material which may then be polymerized, and next the cavity between the mold pieces may be filled with Reactive Mixture that may then be polymerized.

In the following sections, detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

Glossary

In this description and claims directed to the presented invention, various terms may be used for which the following definitions will apply:

Back Curve Piece or Back Insert Piece: as used herein (and sometimes as an insert back curve) refers to a solid element of a multi-piece Rigid Insert which when assembled into the said insert will occupy a location on the side of the lens that is on the back. In an Ophthalmic Device, such a piece would be located on the side of the insert that would be closer to the user's eye surface. In some embodiments the back curve piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple back curve pieces and one of them may include the optic zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Front Curve Piece or Front Insert Piece: as used herein (and sometimes as an insert front curve) refers to a solid element of a multi-piece Rigid Insert which when assembled into the said insert will occupy a location on the side of the lens that is on the front. In an Ophthalmic Device, a Front Curve Piece would be located on the side of the insert that would be further from the user's eye surface. In some embodiments, the piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple front curve pieces and one of them may include the optic zone, while others may be annular or portions of an annulus.

Lens-forming mixture or Reactive Mixture or Reactive Monomer Mixture (RMM): as used herein refers to a monomer or prepolymer material that can be cured and cross-linked or cross-linked to form an Ophthalmic Lens. Various embodiments can include lens-forming mixtures with one or more additives such as UV blockers, tints, photoinitiators or catalysts, and other additives one might desire in an Ophthalmic Lenses such as, contact or intraocular lenses.

Lens-forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens forming surface can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: refers to a rigid or semi-rigid object that may be used to form lenses from uncured formulations. Some preferred molds include two mold parts forming a front curve Mold part and a back curve Mold part.

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: To restore to a state with higher capacity to do work. Many uses within this invention may relate to restoring a device to the capability to flow electrical current at a certain rate for a specified, reestablished time period.

Released from a mold: means that a lens is either completely separated from the mold, or is only loosely attached so that it can be removed with mild agitation or pushed off with a swab.

Rigid Insert or Insert Device: as used herein refers to an insert that maintains a predefined topography. When included in an Ophthalmic Lens, the Rigid Insert may contribute to the functionality of the Lens. For example, varying topography of or densities within the Rigid Insert may define zones, which may correct vision in users with astigmatism. In some embodiments, an Insert Device may comprise multiple insert pieces.

Stabilizing Feature: as used herein refers to a physical characteristic that stabilizes an Ophthalmic Device to a specific orientation on the eye, when the Ophthalmic Device is placed on the eye. In some embodiments, the Stabilizing Feature may add sufficient mass to ballast the Ophthalmic Device. In some embodiments, the Stabilizing Feature may alter the front curve surface, wherein the eyelid may catch the Stabilizing Feature and the user may reorient the Lens by blinking. Such embodiments may be enhanced by including Stabilizing Features that may add mass. In some exemplary embodiments, Stabilizing Features may be a separate material from the encapsulating biocompatible material, may be an insert formed separately from the molding process, or may be included in the Rigid Insert or Media Insert.

Stacked Integrated Component Devices or SIC Devices as used herein refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours.

Swellable Index: as used herein refers to the expandability or expanding tendency of a specific material during the manufacturing of an Ophthalmic Lens.

Three-dimensional Surface or Three-dimensional Substrate: as used herein refers to any surface or substrate that has been three-dimensionally formed where the topography is designed for a specific purpose, in contrast to a planar surface.

Stabilizing Features

In some embodiments of Ophthalmic Lenses, the functionality of the Lens depends on a specific orientation on the eye. For example, in Lenses that currently address vision correction for astigmatic patients, Stabilizing Features orient the Lens to properly mirror the astigmatism. Incorporating a Rigid Insert into an Ophthalmic Lens may expand the number of functions that an Ophthalmic Lens may provide. These functions may further require Stabilizing Features. Current Stabilizing Features address basic orientation needs in relatively homogenous Lenses. Though the Lenses may have a defined Three-dimensional Surface, the material may be consistent throughout the Lens, including the Stabilizing Features. In addition, current Stabilizing Features are included as aberrations on the surface of the mold that creates the Three-dimensional Surface of the Ophthalmic Lens.

In contrast, a Rigid Insert may be created independently and then inserted within a molding apparatus prior to the formation of the Ophthalmic Lens. The Rigid Insert may comprise a separate material than the encapsulant, which may be a soft biocompatible polymer. The Rigid Insert may provide the functionality of the Ophthalmic Lens. Therefore, the Stabilizing Features may orient the Ophthalmic Lens on the eye in relation to the Rigid Insert. This may require complex methods of manufacturing Stabilizing Features and including them within the Ophthalmic Lens consistent with relative placement of the Rigid Insert to the Stabilizing Features during the molding process. Such methods may depend on the specific embodiment of the Ophthalmic Lens and the corresponding Rigid Insert.

Figure 1:
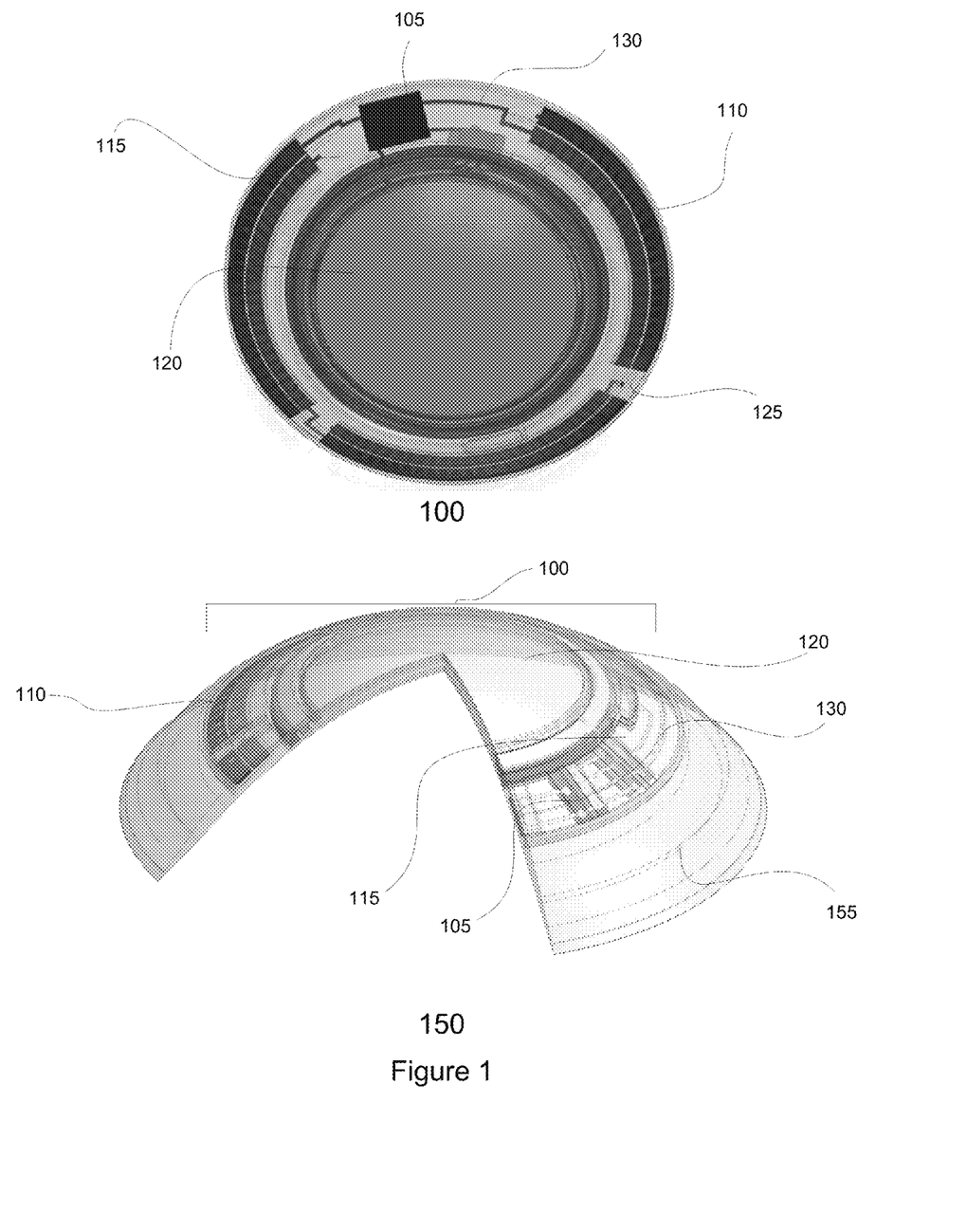
FIG. 1 illustrates an exemplary embodiment of a Media Insert for an energized Ophthalmic Device and an exemplary embodiment of an energized Ophthalmic Device.

Proceeding to FIG. 1, an exemplary embodiment of an Ophthalmic Lens with a Rigid Insert with energized elements is illustrated. In some embodiments, the Rigid Insert 100 may be included in an Ophthalmic Lens 150, which may comprise a polymeric biocompatible material, such as, for example, a silicone hydrogel. The Ophthalmic Lens 150 may include a rigid center, soft skirt design wherein a central rigid optical element comprises the Rigid Insert 100. In some specific embodiments, the Rigid Insert 100 may be in direct contact with the atmosphere and the corneal surface on respective anterior and posterior surfaces, or alternatively, the Rigid Insert 100 may be encapsulated in the Ophthalmic Device 150. The periphery 155 or, in some embodiments, the encapsulant of the Ophthalmic Lens 150 may be a soft skirt material, including, for example, a hydrogel material.

A Rigid Insert with energization elements is illustrated for exemplary purposes only. Some embodiments, for example, may include single piece Rigid Inserts, wherein the functionality is included on the surface or within the composition of the Rigid Insert. Alternatively, the Rigid Insert may comprise multiple pieces with passive elements that, when combined, provide a static functionality.

Figure 2:
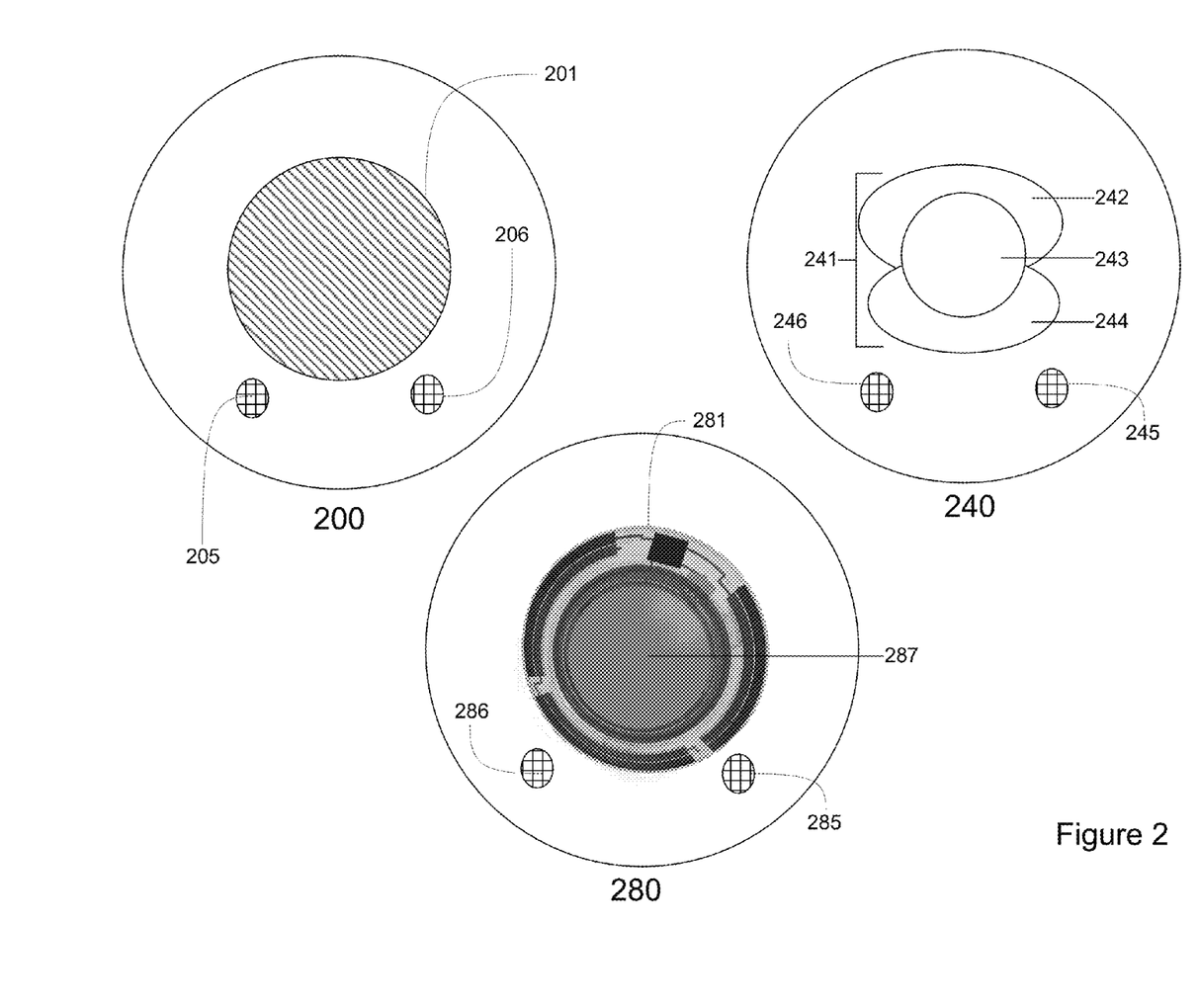
FIG. 2 illustrates exemplary embodiments of Ophthalmic Lenses with Rigid Inserts where the functionality may depend on a specific orientation on an eye.

Proceeding to FIG. 2, exemplary embodiments of Ophthalmic Lenses 200, 240, 280 with Rigid Inserts 201, 241, 281 are illustrated, wherein the Rigid Insert 201, 241, 281 included in the Ophthalmic Lenses 200, 240, 280 provide different functionalities that may require Stabilizing Features 205, 206, 245, 246, 285, 286. In some embodiments, the Ophthalmic Lens 200 may include a Rigid Insert 201 that provides a polarizing function. The polarization may be directional and may require a specific orientation of the Ophthalmic Lens 200 on the eye. Stabilizing Features 205, 206 may ensure the Rigid Insert 201 is oriented correctly when the Ophthalmic Lens 200 is placed on the eye.

Other embodiments may include an Ophthalmic Lens 240 with a Rigid Insert 241 that corrects vision for astigmatic patients. To accommodate the varied curvatures of the eye, the Rigid Insert 241 may be asymmetrical. For example, the Rigid Insert 241 may include zones 242-244, wherein each zone 242-244 corrects a different angle of refraction. Each zone 242-244 may be tailored to a particular set of astigmatic characteristics. Accordingly, Stabilizing Features 245, 246 may properly orient the Ophthalmic Lens 240 so that the zones 242-244 properly align with the their corresponding curvature of the eye.

A Rigid Insert 241 may be more effective in correcting astigmatism than a simple soft Ophthalmic Lens, which may not allow for precise vision correcting. Incorporating the Rigid Insert 241 within an Ophthalmic Lens 240 may be more comfortable than a typical rigid gas permeable lens. Adding Stabilizing Features 245, 246 may combine comfort and precise vision correction for astigmatism.

In other alternative embodiments, the Rigid Insert 281 included in an Ophthalmic Lens 280 may comprise multiple pieces, which may create a cavity for inclusion of active electric components 282-284. In such embodiments, the Rigid Insert 281 may comprise a variable optic portion 287, for example, a liquid meniscus lens, wherein the activation of the liquid meniscus alters the corrective power of the Lens. To activate, the Rigid Insert 281 may include a load 282, a Power Source 283, and conductive traces 284 in the periphery of the insert, so that the electronic components may not impede the Optic Zone 287.

In some embodiments, a Rigid Insert 281 with a variable optic portion 287 may not be symmetrical. In some such embodiments, the different components 282-284 may add different amounts of mass. For example, the load 282 may add significantly more mass than the conductive traces 284 and the Power Source 283. Without Stabilizing Features 285, 286, the load 282 may pull the Ophthalmic Lens down so that the variable optic portion 287 does not align with the Optic Zone of the eye. In such embodiments, Stabilizing Features 285, 286 may also orient the Ophthalmic Lens 280 on the eye to mitigate discomfort.

The embodiments in FIG. 2 are shown for exemplary purposes only and other functionalities of the Ophthalmic Lens may require a specific orientation on the eye. A functionality that requires orientation may be presumed for the following figures. For illustrative purposes, the Rigid Inserts are shown to include a function shown in FIG. 2, but Rigid Inserts may provide other functions, and those functionalities should be considered within the scope of the inventive art.

Figure 3A:
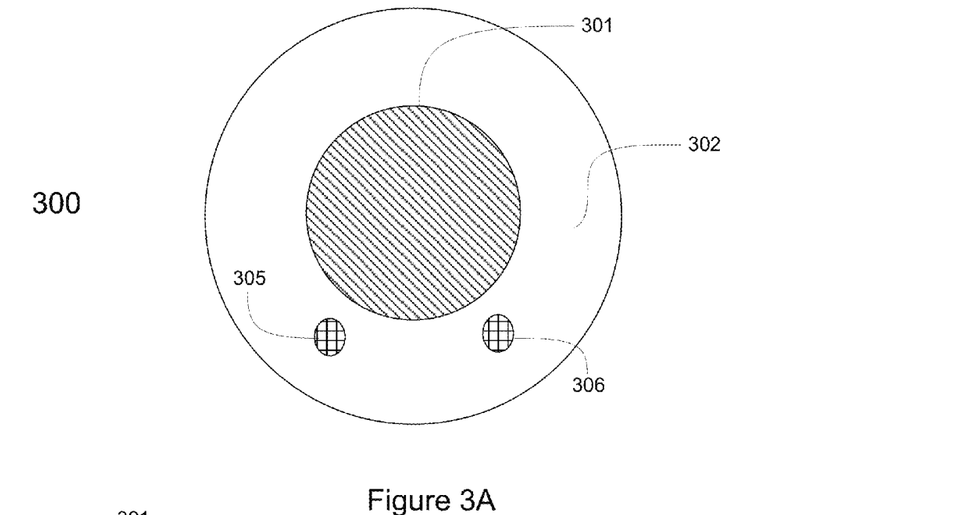
FIG. 3A-3C illustrate exemplary embodiments of an Ophthalmic Lens with Stabilizing Features, wherein the Stabilizing Features are separate from the Rigid Insert.

Proceeding to FIG. 3A, an exemplary embodiment of Ophthalmic Lens 300 that includes a polarizing Rigid Insert 301 and Stabilizing Features 305, 306 is illustrated. In some embodiments, the Stabilizing Features 305, 306 may be included in the soft biocompatible portion 302, comprising a polymerized RMM, such as hydrogel, of the Ophthalmic Lens 300. In such embodiments, the Stabilizing Features 305, 306 may be a different material than the soft portion 302. For example, the Stabilizing Feature 305, 306 may comprise a denser material than the surrounding soft portion 302 or the Stabilizing Feature 305, 306 may comprise a material with a different Swellable Index than the soft portion 302. For example, the different Swellable Index may allow for the Stabilizing Feature to swell at a different rate, may allow the Stabilizing Feature to swell more than the encapsulant, or may allow a combination thereof.

Figure 3B:
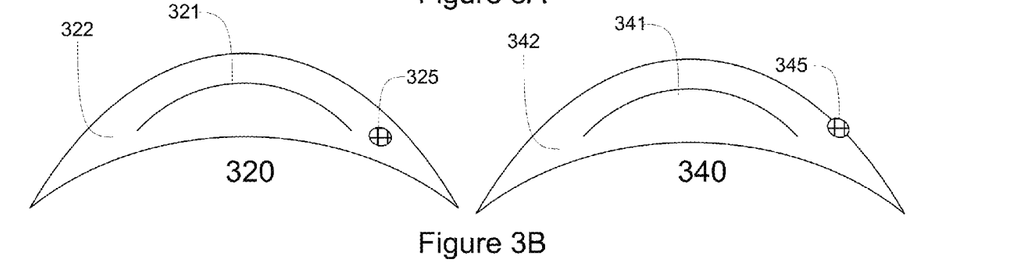

Proceeding to FIG. 3B, exemplary embodiments of Ophthalmic Lenses 320, 340 including a Rigid Insert 321, 341 and Stabilizing Features 325, 345 are shown in cross section, wherein the Stabilizing Features 325, 345 are independent from the Rigid Insert 321, 341. In said exemplary embodiments, the Stabilizing Features 325, 345 comprise a material different from the soft portion 322, 342, wherein the distinct material is included in the soft portion 322, 342. In some embodiments, the Stabilizing Feature 325 may be fully encapsulated within the soft portion 322 of the Ophthalmic Lens 320, wherein the Stabilizing Feature 325 does not affect the front surface topography of the Ophthalmic Lens. In such embodiments, the added mass of the Stabilizing Feature 325 may be sufficient to orient the Ophthalmic Lens 320 on the eye.

In alternate embodiments, the Stabilizing Feature 345 may alter the front surface topography of the Ophthalmic Lens 340. In such embodiments, when a user blinks, the eyelid may catch the Stabilizing Feature 345 so that each blink reorients the Ophthalmic Lens 340 on the eye. The Stabilizing Feature 345 may also add mass to a specific region of the soft portion 342 of the Ophthalmic Lens 340, which may enhance the stability of the Lens on the eye.

Figure 3C:
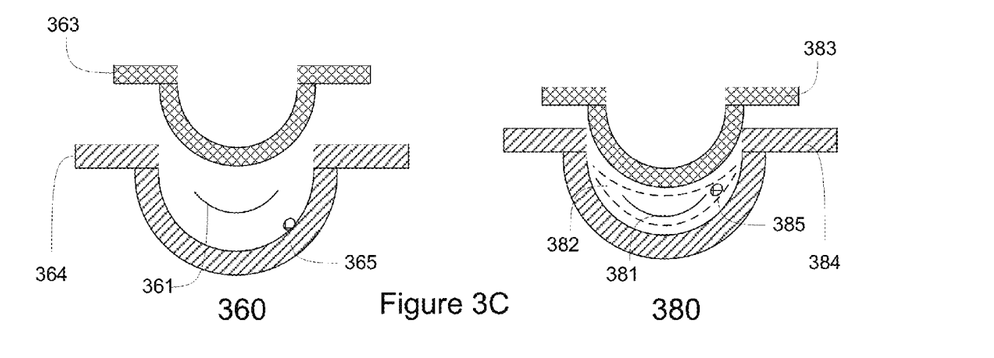

Proceeding to FIG. 3C, exemplary embodiments of a molding apparatus 360, 380 for the formation of an Ophthalmic Lens that includes a Rigid Insert 361, 381 and Stabilizing Features 365, 385 are illustrated in cross section. The Stabilizing Features 365, 385 may be included in positions relative to the Rigid Inserts 361, 381, wherein the Stabilizing Features 365, 385 may orient an Ophthalmic Lens that includes the Rigid Insert 361, 381 on the eye in a manner that enables the intended functionality of the Lens.

In some embodiments, the Rigid Insert 361, 381 may be formed through a process of cutting out insert pieces from thermoforming material, wherein alignment features may be cut into the insert piece such as notches, grooves, or flats for example. These features may be used to align the insert piece or formed ophthalmic insert devices in subsequent processing. Alignment features on the insert piece may be useful in precision placement of the components. The equipment that processes the thin film substrate may utilize these features to move the sheet and attached or holding hardware to an internal alignment location within its operating space. For example, some insert pieces may have notches for an apparatus to place the piece with precision and may include grooves and to ensure proper alignment with another piece or with the molding apparatus.

In some embodiments, the apparatus may include molding the Ophthalmic Lens between a Front Curve Mold 364, 384 and Back Curve Mold 363, 383. A Rigid Insert 361, 381 may be included between the Mold Pieces 363, 364, 383, 384 prior to adding the encapsulating monomer. The monomer may then be polymerized through a curing process.

In some embodiments, the Stabilizing Feature 365 material may be added to the surface of the Front Curve Mold Piece 364 prior to adding the encapsulating material. In such embodiments, the resulting Ophthalmic Lens 340 may include Stabilizing Features 345 that are not fully encapsulated by the soft portion 342 of the Lens 340, such as shown in FIG. 3B. Where the Stabilizing Feature 365 is exposed, the Stabilizing Feature 365 may comprise a biocompatible material with a different swellable index than the soft portion of the Ophthalmic Lens, wherein the Stabilizing Feature 365 assumes an independent shape throughout the process of forming the Ophthalmic Lens. For example, the material of the Stabilizing Feature 365 may be partially cured prior to the addition of the encapsulant. The material of the Stabilizing Feature 365 may further comprise adhesive properties so that the Stabilizing Feature 365 may properly attach to the surface of the Ophthalmic Lens.

Alternatively, not shown, the Stabilizing Feature may be applied to the Rigid Insert prior to encapsulation. In such embodiments, the Stabilizing Feature may be aligned with the Rigid Insert prior to the molding process.

In alternative embodiments, the Stabilizing Feature 385 may be added to the Ophthalmic Lens after the encapsulant is added between the Front Curve Mold Piece 384 and the Back Curve Mold Piece 383. The addition of the Stabilizing Feature 385 may occur before the encapsulant 382 has been fully cured. For example, the Stabilizing Feature 385 may be injected into the partially cured encapsulant 382, wherein the remaining cure process fully cures the encapsulant 382 and the Stabilizing Feature 385. The material of the Stabilizing Feature 385 may have a different swellable index than the encapsulant so that, when fully cured, the Stabilizing Feature 385 may assume a specific shape. For example, the Stabilizing Feature 385 material may be injected to a specific depth within the encapsulant, wherein swelling the Stabilizing Feature 385 material during the curing process alters the front surface topography of the Ophthalmic Lens.

Figure 4A:
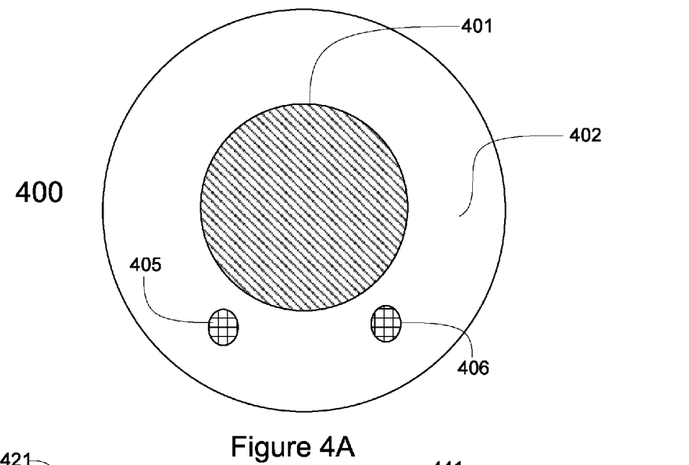
FIG. 4A-4C illustrate alternate embodiments of an Ophthalmic Lens with Stabilizing Features, wherein the Stabilizing Features are separate from the Rigid Inserts.

Proceeding to FIG. 4A, an alternative embodiment of an Ophthalmic Lens 400 that includes Stabilizing Features 405, 406 and a Rigid Insert 401. In such embodiments, the Stabilizing Features 405, 406 may be separate stabilizing inserts. Such inserts may be formed independently from the formation of the Ophthalmic Lens 400.

Figure 4B:
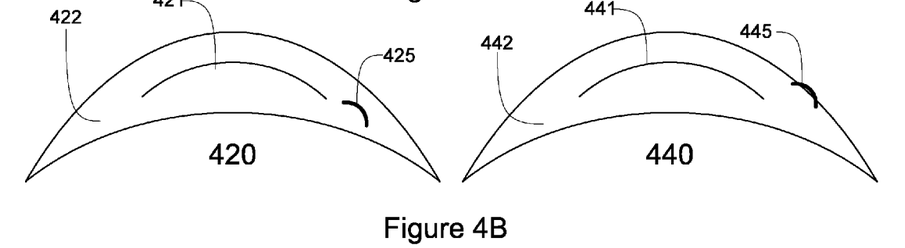

Proceeding to FIG. 4B, examples of embodiments of an Ophthalmic Lens 420, 430 with a Rigid Insert 421, 431 and Stabilizing Features 425, 435, wherein the Stabilizing Features 425, 435 are stabilizing inserts, are illustrated in cross section. Similar to the embodiments in FIG. 3B, the Stabilizing Features 425, 435 may be located at various depths on the Ophthalmic Lens 420, 430.

In some embodiments, the Stabilizing Feature insert 425 may be inserted within the soft portion 422 to a depth that may not alter the front surface topography of the Ophthalmic Lens 420, wherein the added mass orients the Ophthalmic Lens 420 on the eye without additional action by the user. Alternatively, the Stabilizing Feature insert 431 may be included to alter the front surface topography of the Ophthalmic Lens 430, wherein a user may orient the Ophthalmic Lens 430 on the eye by blinking. The added mass may enhance the stability of the Ophthalmic Lens 430 on the eye.

Figure 4C:
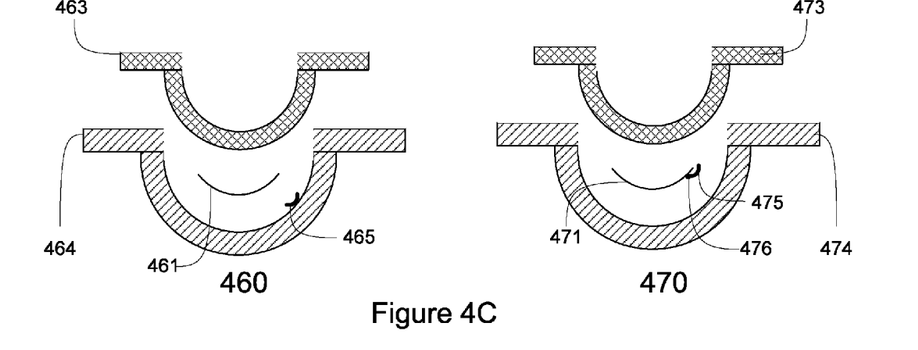

Proceeding to FIG. 4C, exemplary embodiments of an apparatus for forming an Ophthalmic Lens that includes a Rigid Insert 461, 471 and Stabilizing Feature inserts 465, 475 are shown in cross section. The Stabilizing Features 465, 475 may be included in positions relative to the Rigid Inserts 461, 471, wherein the Stabilizing Features 465, 475 may orient an Ophthalmic Lens that includes the Rigid Insert 461, 471 on the eye in a manner that enables the intended functionality of the Lens.

Stabilizing Features 465, 475 may be formed through similar process steps as a Rigid Insert 461, 471. In some embodiments, the Stabilizing Feature inserts 465, 475 may be formed through a thermoforming process. In such embodiments, alignment features may be included in the Stabilizing Features 465, 475, which may allow precise alignment between the Rigid Insert 461, 471 and the Stabilizing Features 465, 475

Similar to FIG. 3C, an Ophthalmic Lens may be formed by molding an encapsulating material, such as, for example, a hydrogel, between a Front Curve Mold 464, 474 and a Back Curve Mold 463, 473. The Rigid Insert 461, 471 may be included within the Ophthalmic Lens by placing the Rigid Insert 461, 471 between the Front and Back Curve Molds 463, 473, 464, 474 prior to adding the encapsulating material.

In some embodiments, the Stabilizing Feature inserts 465 may be placed on the Front Curve Mold 464 prior to adding the encapsulating material and separately from adding the Rigid Insert 461. The Front Curve Mold 464 may include aberrations on its surface that may secure the position of the Stabilizing Feature 465 insert. Such aberrations may allow for more precise placement of the Stabilizing Feature 465 inserts relative to the Rigid Insert 461. In such embodiments, the Stabilizing Feature 465 insert may not be fully encapsulated by the hydrogel, which may allow the Stabilizing Feature 465 to alter the front surface topography of the Ophthalmic Lens 430, as shown, for example in FIG. 4B.

In alternate embodiments, the Stabilizing Feature 475 insert may be initially adhered at a connection point 476 to the Rigid Insert 471 prior to placement between the Front Curve Mold Piece 474 and the Back Curve Mold Piece 473. Attaching the Stabilizing Feature 475 to the Rigid Insert 471 may allow for precise alignment. For example, in embodiments where the Rigid Insert 471 may be formed through a thermoforming process, the Rigid Insert 471 may be thermoformed to include alignment features that may specify the connection point 476. Such an alignment feature may indicate the intended orientation of the Rigid Insert 471, which may be particularly significant where the Rigid Insert 471 may be manufactured separately from the Stabilizing Feature 475 inserts.

In some embodiments, the adhesive material at the connection point 476 may have a different swellable index than the surrounding encapsulant. This may allow the Stabilizing Feature 475 insert to separate from the Rigid Insert 471 during the curing process. For example, the adhesive material may swell to a point that pushes the Stabilizing Feature 475 insert to alter the front surface topography of the Ophthalmic Lens 435, as shown, for example, in FIG. 4B. Such an embodiment may allow for a fully encapsulated Stabilizing Feature 475.

Figure 5A:
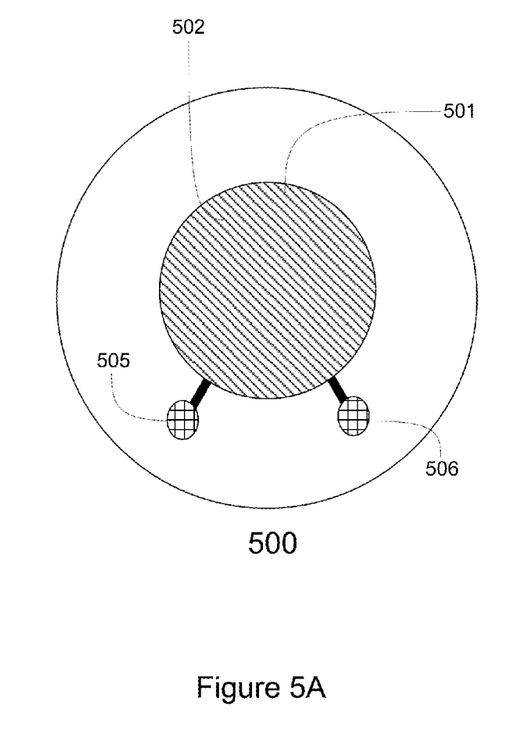
FIG. 5A-5B illustrate exemplary embodiments of an Ophthalmic Lens with Stabilizing Features, wherein the Stabilizing Features are included with the Rigid Insert.

Proceeding to FIG. 5A, an embodiment of an Ophthalmic Lens 500 that includes a Rigid Insert 501 with Stabilizing Features 505, 506 is illustrated. In said embodiment, the Stabilizing Features 505, 506 are included with Rigid Insert 501, wherein the Rigid Insert 501 is encapsulated in a soft biocompatible material 502, such as hydrogel. In some such embodiments, the Stabilizing Features 505, 506 may be included on the Rigid Insert 501 through a thermoforming process. For example, the Rigid Insert 501 may be removed from a thermoformed sheet, which may allow for complex Rigid Insert 501 designs, wherein the Rigid Insert 501 is not symmetrical. In some thermoformed embodiments, the Rigid Insert 501 may include alignment features, wherein the Stabilizing Features 505, 506 may be affixed through a separate adhesion process, including, for example, a welding process.

Such embodiments are distinct from the examples illustrated in FIGS. 4B and 4C. In FIG. 4B, the Stabilizing Features 425, 435 may be separate from the Rigid Insert 421, 431 within the Ophthalmic Lens. The connection point 476 may be a temporary adhesion to ensure proper alignment between the Rigid Insert 471 and the Stabilizing Features 475.

Figure 5B:
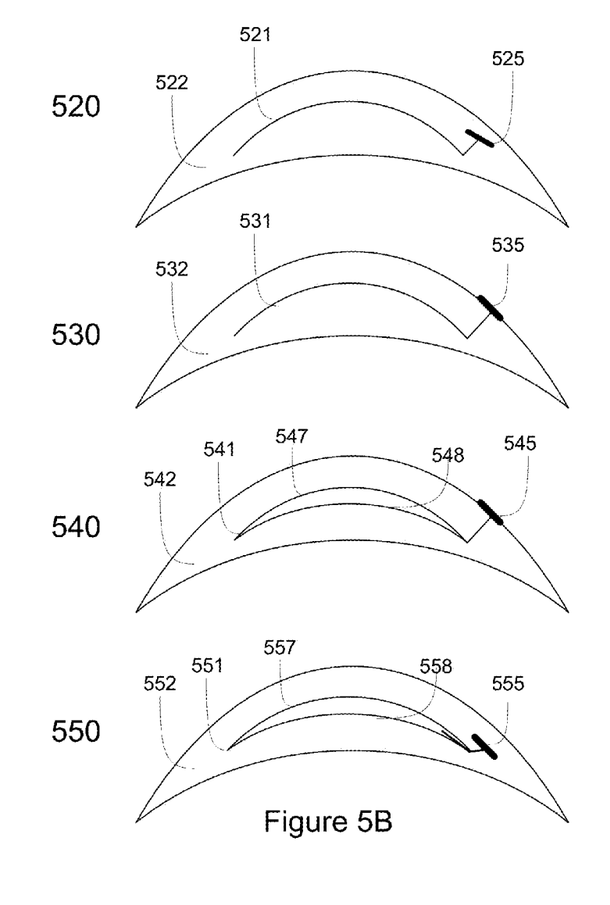

Proceeding to FIG. 5B, exemplary embodiments of an Ophthalmic Lens 520, 530, 540 that include a Rigid Insert 521, 531, 541, wherein the Rigid Insert 521, 531, 541 includes Stabilizing Features 525, 535, 545, are illustrated in cross section. Some embodiments may include an Ophthalmic Lens 520, 530 with a single-piece Rigid Insert 521, 531, wherein the Rigid Insert 521, 531 includes the Stabilizing Features 525, 535. In some embodiments, the Stabilizing Feature 525 may be included with the Rigid Insert 521 in such a way that prevents the Stabilizing Feature 525 from altering the front surface topography of the Ophthalmic Lens 520. In such embodiments, the added mass of the Stabilizing Feature 525 may be sufficient to properly orient the Ophthalmic Lens 520 on the eye. Alternatively, the Stabilizing Feature 535 may extend from the Rigid Insert 531 to alter the front surface topography of the Ophthalmic Lens 530, wherein the eyelid may catch the protrusion. In such embodiments, the user may realign the Ophthalmic Lens 530 through blinking.

In other embodiments, the Rigid Insert 541, 551 may comprise a multi-piece Rigid Insert. The Rigid Insert 541, 551 may include a front insert piece 547, 557 and a back insert piece 548, 558. In some such embodiments, the front insert piece 547, 557 and back insert piece 548, 558 may create a cavity, which, for example, may allow for the inclusion of electrically active elements and a variable optic portion. Alternatively, the front insert piece 547, 557 and the back insert piece 548, 558 may comprise two passive layers that may be combined to provide functionality to the Ophthalmic Lens 540, 550.

For embodiments with multi-piece Rigid Inserts 541, 551, Stabilizing Features 545, 555 may be included through various methods. In some embodiments, the back insert piece 548 or the front insert piece 542 may include the Stabilizing Feature 545, for example, through a thermoforming process as may apply for a single-piece Rigid Insert 521, 531. In such embodiments, the front insert piece 547 may be attached to the back insert piece 548 in a separate step than the inclusion of the Stabilizing Feature 545.

Alternatively, the Stabilizing Feature 555 may be included in the Rigid Insert 551 when the front insert piece 557 is attached to the back insert piece 558. In such embodiments, the Stabilizing Feature may be placed between the front insert piece 557 and the back insert piece 558. The front insert piece 557, back insert piece 558, and the Stabilizing Feature 55 may be attached through a variety of means, including, for example, adhesion, welding, or interconnecting alignment features. In embodiments that include thermoforming, the front insert piece 557, back insert piece 558, and Stabilizing Features 555 may include alignment features to ensure the proper orientation of the Ophthalmic Lens 550 on the eye relative to the Rigid Insert 551.

Materials for Insert Based Ophthalmic Lenses

In some embodiments, a lens type can be a lens that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, which sometimes may be called an insert encapsulating layer, that surrounds the insert may be comprised of standard hydrogel lens formulations. Exemplary materials with characteristics that may provide an acceptable match to numerous insert materials may include the Narafilcon family; including Narafilcon A and Narafilcon B. Alternatively, the Etafilcon family; including Etafilcon A may represent good exemplary material choices. A more technically inclusive discussion follows on the nature of materials consistent with the art herein; but it may be clear that any material which may form an acceptable enclosure or partial enclosure of the sealed and encapsulated inserts are consistent and included.

Suitable silicone containing components include compounds of Formula I where:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a Reactive Mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

Formula II wherein: Y denotes —O—, —S— or —NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsilyloxy)silyl]propyl allyl carbamate; 3-[tris(trimethylsilyloxy)silyl]propyl vinyl carbamate; trimethylsilylethyl vinyl carbonate; trimethylsilylmethyl vinyl carbonate, and Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
\* denotes a urethane or ureido linkage;
$a$ is at least 1;
A denotes a divalent polymeric radical of formula:

Formula VII

$R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:
Formula IX (the full structure may be understood by joining corresponding asterisk regions, \* to \*, \*\* to \*\*)

-continued wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X (the full structure may be understood by joining corresponding asterisk regions, * to *)

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Although the invention may be used to provide inserts containing hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Conclusion

The present invention, as described above and as further defined by the claims below, provides methods for creating an Ophthalmic Lens with Stabilizing Features and a Rigid Insert, where the Stabilizing Features may orient the Ophthalmic Lens when placed on an eye. In some embodiment, the Stabilizing Features may be included as a unique Reactive Monomer Mixture with separate properties than the encapsulating RMM. Other embodiments may include Stabilizing Features comprising separate insert pieces. In alternate embodiments, the Rigid Insert may include the Stabilizing Features, such as, for example, through thermoforming techniques.

The invention claimed is:

1. An ophthalmic device with at least one stabilizing feature, the ophthalmic device comprising:
   a lens comprising a biocompatible material, wherein the biocompatible material allows for placement of the lens on an eye;
   a first rigid insert integral with the lens; and
   at least one stabilizing feature comprising a second rigid insert and a third rigid insert, wherein the stabilizing feature orients the lens when the ophthalmic device is placed on the eye.

2. The ophthalmic device of claim 1, wherein the stabilizing feature alters a front surface topography of the ophthalmic device.

3. The ophthalmic device of claim 1, wherein the lens forms from polymerizing a reactive monomer mixture into a hydrogel between a front curve mold and a back curve mold.

4. The ophthalmic device of claim 1, wherein at least one of the second rigid insert and the third rigid insert comprises a coloration or a marking, wherein the coloration or the marking is a visible orientation cue.

5. The ophthalmic device of claim 1, wherein the biocompatible material comprises a polymerized hydrogel.

6. The ophthalmic device of claim 5, wherein the polymerized hydrogel comprises a silicone.

7. The ophthalmic device of claim 1, wherein the first rigid insert comprises a thermoformed three-dimensional shape.

8. The ophthalmic device of claim 1, wherein the lens encapsulates the first rigid insert.

9. The ophthalmic device of claim 1, wherein the first rigid insert is in direct contact with the atmosphere and a cornea of an eye on respective anterior and posterior surfaces.

10. The ophthalmic device of claim 1, wherein the first rigid insert is asymmetrical.

11. The ophthalmic device of claim 1, wherein the first rigid insert comprises zones having different indices of refraction.

12. The ophthalmic device of claim 11, wherein the zones are tailored to correct for astigmatic characteristics of the eye.

13. The ophthalmic device of claim 12, wherein the stabilizing feature properly orients the ophthalmic device on the eye by aligning the zones with their corresponding regions of the eye.

* * * * *